March 6, 1962   E. G. COOK   3,023,459
METHOD OF MANUFACTURING PHONOGRAPH RECORDS
Filed Feb. 7, 1957

OPEN BOOK

LOADING

PRE-HEATING
280°–450°F
5–100 psi
10–30 SECONDS

PRESSING
280°–450°F
175–300 psi
5–10 SECONDS

COOLING

EDGE-TRIMMING

INVENTOR.
BY EMORY G. COOK
Curtis, Morris & Safford
ATTORNEYS

March 6, 1962 — E. G. COOK — 3,023,459
METHOD OF MANUFACTURING PHONOGRAPH RECORDS
Filed Feb. 7, 1957 — 2 Sheets-Sheet 2

INVENTOR.
EMORY G. COOK
BY Curtis, Morris & Safford
ATTORNEYS

United States Patent Office 3,023,459
Patented Mar. 6, 1962

3,023,459
METHOD OF MANUFACTURING
PHONOGRAPH RECORDS
Emory G. Cook, 125 Strawberry Hill Ave.,
Stamford, Conn.
Filed Feb. 7, 1957, Ser. No. 638,852
7 Claims. (Cl. 18—48.3)

This invention relates to an improved method for the manufacture of phonograph records.

An object of this invention is to appreciably lower the cost of making phonograph records without sacrificing record quality. The quality of the records made by the method and apparatus of the present invention is improved over that resulting from the methods and apparatus of the prior art. These records are more pleasingly quiet, that is, have less surface "scratch" for a comparable degree of hardness so that they better withstand "playing" with less wear. Records made by the methods and apparatus of the prior art which have a comparable quietness are usually much softer and thus wear more quickly.

Further objects are to provide a way of making records which can be carried out with relatively simple and inexpensive equipment and to enable short manufacturing "runs" of different records to be made commercially practical.

These and other objects will in part be understood from and in part pointed out in the description given hereinafter.

In manufacturing phonograph records from thermoplastic material, for example, in making vinylite long playing records, a widespread prior practice is to begin by placing a lump or mass of plastic material called a "biscuit" centrally between opposed grooved record matrices in a hydraulic press. This biscuit is usually about three inches in diameter and quite thick at first. Thereafter, the biscuit is squeezed out to flat disc shape in the press under heat and great pressure. During the course of this pressing treatment, the plastic material is forced into conformity with the grooves in the matrices in the press.

In this prior practice considerable time, usually about one half an hour or more, is required for the complete heating cycle to which the record material is subjected from the initial compounding of the material to the final pressing. The length of the heat history of the plastic material is important because its deterioration is a function of the product of temperature and duration of the heat history. High pressures are required because the base material must flow radially to all parts of each matrix, and creep into every groove. The pressures required by this prior practice often run as high as 2000 p.s.i. applied over a ram having a diameter of about 12 inches, or an area of about 115 square inches, representing a total force of about 230,000 pounds. These forces can only be obtained, as a practical matter, with heavy and massive equipment, so that, for a given output a large and costly amount of equipment is required. The present invention provides a practical solution to this difficulty.

When squeezing a lump, or biscuit, of plastic record material out to flat disc form in accordance with the prior practice outlined above, the plastic is "worked" because of the tremendous heat and pressure used. Thus, because of the long heat cycle and because of this working the plastic loses certain desirable properties which it has in virgin form and the quality and smoothness of the record surface suffers.

When a thick plastic biscuit is squeezed between the faces of a record matrix, the plastic must flow over individual ridges engraved on these faces and corresponding to the sound track grooves in a completed record. Because of repeated squeezings and flowings of the plastic, these ridges in time become warped and worn. There is moreover a tendency for the faces of the matrix to bend as the plastic biscuit is squeezed. Further, it often happens that the outwardly flowing plastic does not completely fill in the leeward side of a ridge. Hence, one or more portions of the outer shoulders of the sound grooves in a finished record are missing and the record is not perfect as it should be. But, using higher temperatures and pressures to promote filling in all of the outer groove shoulders causes additional undesired "working" of the plastic and is thus self-defeating. The present invention eliminates these difficulties.

In accordance with the present invention, a suitable plastic material, such as polyvinyl chloride, in pulverized or granulated form is applied with controlled evenness to substantially the entire face of a record matrix. That is, a "biscuit" is laid down in powdered form and has an initial diameter approximately the same as the finished record and a uniform thickness. Thereafter the matrix is closed and the material within it is then heated and pressed into a finished phonograph record. Because the plastic material in the very beginning covers all or most of the record matrix little if any radial flow of the material occurs or is necessary. Accordingly, the time required for heating and pressing the material into finished form is greatly reduced. Moreover, this operation can be carried out at much lower pressures than were formerly thought possible. As a result, the physical equipment needed for production can be made smaller and lighter and can operate with greater speed.

Among the many advantages of the present invention are those resulting from the fact that a very short total heat cycle, of the order of one-half a minute, is enabled to be employed. Thus, when desired, higher temperatures of the plastic material can be used for this brief period. This results in better formation of the grooves while actually avoiding any substantial deterioration of the material. The record is more pleasing because of the reduction in surface noise and a harder more wear resistance surface is obtained.

Because of the less massive equipment enabled to be used, electrical heating is now made economically feasible instead of steam. Thus, advantageously the brief higher temperature heat cycles are readily obtained, when desired.

By virtue of the fact that the improved method and apparatus of the present invention enable greatly reduced pressure to be used, the plastic material is not appreciably "worked" and does not tend to decompose or change its chemical form. The finished record surface is therefore smoother. Further, since there is no appreciable radial flow of plastic material, the material is better able to conform to and fill every minute space on each side of the ridges in the record matrix and these ridges are not quickly worn or eroded with continued use. Thus, not only are high quality records made in this way, but the equipment required in making them is far less expensive to buy and to operate. A much higher production rate is easily obtained and far greater flexibility in scheduling of production runs is provided.

A better understanding of the invention together with a fuller appreciation of its many advantages will best be gained from a study of the following description considered in connection with the accompanying drawings in which:

FIGURES 1 through 5 schematically illustrate successive steps of a process of phonograph record manufacture utilizing principles of the invention;

Figure 1:
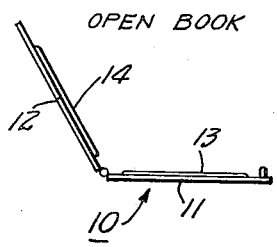
Figure 2:
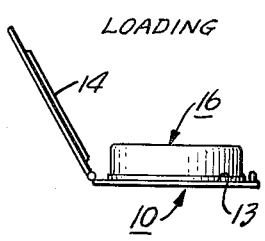

One process for record manufacturing in accordance with the invention is given by way of illustration in FIGURES 1 through 5. As seen in FIGURE 1 a book 10, having two thin backs 11 and 12 hinged together and whose inner die faces 13 and 14 are covered with the negatives of the sound record grooves to be imprinted on a finished record, is placed open with one face up ready to be covered with a layer or "biscuit" of pulverized or granulated plastic. FIGURE 2 shows the book 10 with its face 13 covered by a loader 16 which is adapted to cover this face with powdered material in a layer of controlled thickness and evenness.

Figure 3:
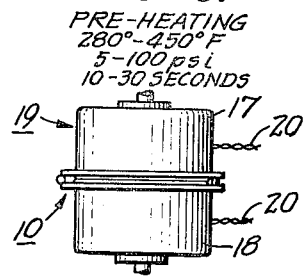

After a layer of material has been applied to the book, the loader is removed, and the book is closed. The closed book is inserted between the upper and lower members 17 and 18 of a hot press 19 as illustrated in FIGURE 3, where it is subjected to a preliminary heating at a temperature in the range from 280° to 450° F., for example, it being usually desirable commercially to use a temperature in the range from 350° to 370° F. As shown, this heating effect is obtained by electrical current fed through wires 20 to resistance heaters associated with each press member.

This preliminary heating continues for approximately one-half minute and is carried out under fairly low pressure. For example, it has been found that an applied pressure of the order of 30 pounds per square inch (p.s.i., gauge pressure, is very satisfactory for most conditions. The purpose of this initial low pressure during this pre-heating step is to provide firm contact between the outside surfaces of the books 11 and 12 and the flat faces of the two press members 17 and 18 to assure reasonably good heat transfer from these press members into the book. Also, this low pressure during pre-heating provides firm contact between the die faces 13 and 14 and the granules of the plastic therebetween to assure rapid heating of the powdered plastic. Thus, at the end of the pre-heating period most of the granules of the powdered plastic have begun to fuse or to coalesce.

As indicated above, it has been found that a gauge pressure equivalent to about two atmospheres is usually highly satisfactory to provide the desired heat transfer into the book and through the backs of the book into the powdered material. However, a lesser pressure down to about 5 p.s.i. may be used during the pre-heating step of the process, so long as reasonably good heat transfer is obtained.

It is not desirable to use a high pressure, that is not above 100 p.s.i., during the pre-heat step because this tends to cause a substantial amount of initial sound groove impression to occur on the two faces of the powdered biscuit before the interior granules are sufficiently fused to enable a good impression to be formed. Such undesired initial impression can unduly limit the escape of air, gases and volatile components from between the granules. Thus it may prevent a good final pressing. For these reasons, a pressure of approximately 30 p.s.i. and a temperature within the range indicated are preferred.

A good criterion to use in judging the pre-heating pressure and temperature is an upper time-limit of one-half minute. Under proper conditions as described above, the pre-heat step can satisfactorily be completed within one-half minute or less using the materials described below. Then during the next step the pressure exerted by this press 19 is increased to somewhere between 175 p.s.i. and 300 p.s.i., on a 12 inch diameter ram for example 250 p.s.i., and is held there for five to ten seconds to make the final impression.

Figure 4:
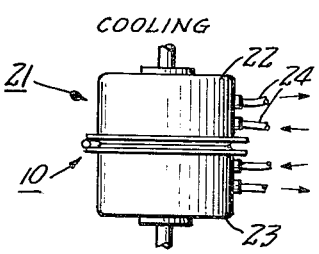

The record book is thereafter taken from the hot press and clamped into a cooling press or stand 21 illustrated in FIGURE 4, where the temperature of the book and the record clamped within it are reduced sufficiently so that the finished record 30 can safely be removed from the book. As shown, the cooling press 21 includes upper and lower press members 22 and 23 which are cooled by water circulated through hoses 24.

Figure 5:
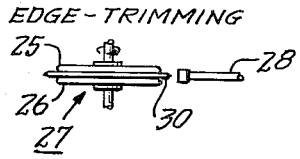

In the final step, the "flash" at the edge of the record is then trimmed by holding it between the rotatable circular clamps 25 and 26 of a trimming lathe 27 for trimming by an edge knife 28 as indicated in FIGURE 5.

Because the pressures required in performing the above outlined steps are relatively very low, it is possible, and this is done according to another feature of the invention, to use as the record matrix assembly a loose "book" 10 separate from its press 19. Such a book seen previously in FIGURE 1 is shown in more detail in FIGURE 6. It includes the two thin backs 11 and 12 hinged together at 29 and having two inner or opposed die faces 13 and 14 upon which the negative of the sound tracks or grooves for each side of a record are engraved. Circumferentially encircling each die face 13 and 14 is a respective one of the beveled coiner rings 31 and 32. When the book is closed, these coiner rings come together and mould the edge of the record being pressed. In the center of book face 13 is positioned a spindle 33 which fits into a corresponding hole 34 in face 14 and serves to form the center hole in each record made.

Figure 6:
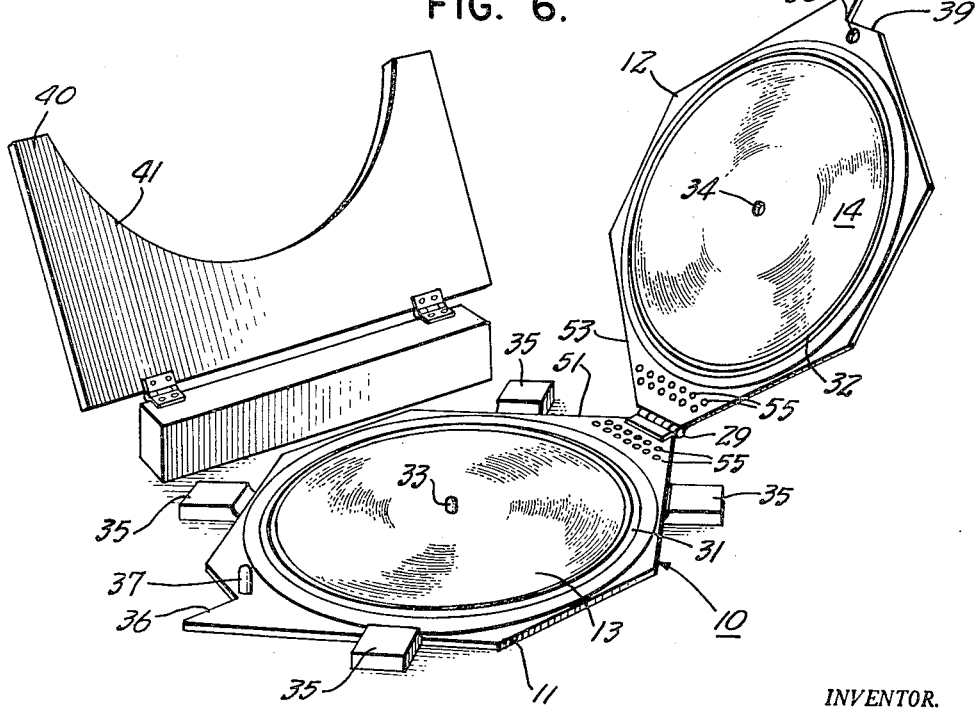
FIGURE 6 is a perspective view of a simplified and improved record matrix assembly or "book" provided according to the invention.

The lower back of the book seen in FIGURE 6 is positioned in a jig horizontally on a table. This jig includes a number of positioning blocks 35 secured to the table. As shown the book is an elongated hexagonal shape, with the hinge 29 at one corner and having an aligning pin 37 at the diametrically opposite side secured to the back 11 just inside of a handle notch 36 and just outside of the coiner ring 31 which fits into a corresponding aligning hole 38 near the other handle notch 39. These handle notches leave offset projecting handle tabs 36a and 39a which are conveniently grasped by the operator in opening the book. A twisting motion of one hand applied to these handle tabs opens the book.

Slightly behind the positions of the jig blocks 35 in raised position is a hinged arm 40 which, during the charging of the book with plastic material, is swung down over die face 13. The semi-circular recess 41 in arm 40 aids in positioning a loader over the center of the book.

Figure 9:
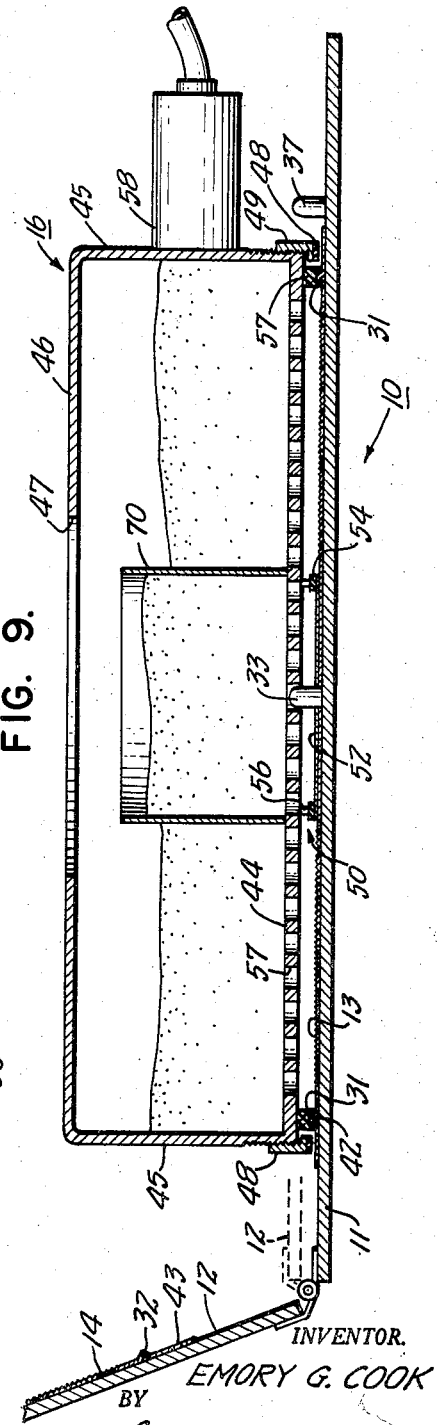
FIGURE 9 is an enlarged cross-section view of the loader of FIGURE 7 positioned over one face of the record book of FIGURE 6.

FIGURE 9 shows, in somewhat enlarged cross-section, die face 13 of book 10 covered by a loader 16 for the application of a controlled layer of pulverized plastic material to face 13. Each of the coining rings 31, 32 is formed by stamping from the rear sides of the matrix backs. The indentations 42, 43 left by this stamping are then filled in by solder or the like so that the outside surface of each matrix where it rests on the magnesium back is perfectly plane and flat.

In order to accelerate the heating and cooling of the book and to facilitate their handling, the backs 11 and 12 are formed of light-weight material having a good heat conductivity and a low specific heat. As shown, these backs 11 and 12 are formed of sheet magnesium alloy having a thickness of .156 of an inch and a density of 1.75 grams per cubic centimeter and a specific heat of .025 calories per gram. Thus, these backs have a low specific heat of .044 calories per cubic centimeter of material. Each matrix 13 or 14 is formed of copper .020 of an inch thick supported by its magnesium back.

As shown, the hinge 29 has one plate 29a on top of the back 11 and the other plate 29b on the outside surface of the back 12 to facilitate the desired closure of the book during pressing to provide a final record .060 of an inch thick. The powder biscuit initially has a thickness in the range from .200 to .250 of an inch thick.

In order to enable the backs of the book readily to close from this range down to a final matrix spacing of .060 while maintaining parallelism between the surfaces of the matrices, the hinge 29 is placed at the end of extending corners or arms 51 and 53 of the backs 11 and 12. These flex to maintain parallelism. In effect, a "loose hinge" action is obtained. To prevent undue loss in heat out through the hinge 29, which projects from between the press members 17 and 18, two rows of holes 55 are drilled in the arms 51 and 53. Thus, a more uniform heating of the backs 11 and 12 occurs during each brief pre-heat and pressing cycle.

Figure 7:
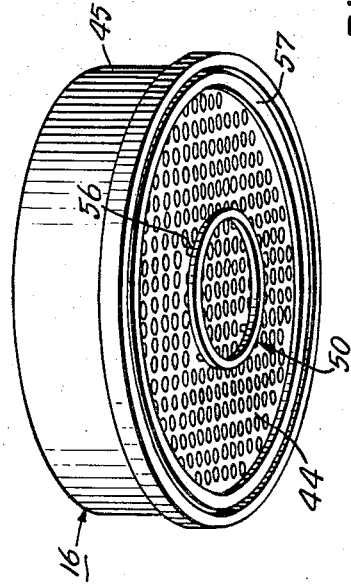
FIGURE 7 is a perspective view from the side and bottom of a pan or loader for directly applying pulverized record base material in accordance with the invention to a record matrix.

Loader 16, which is shown also in FIGURE 7, is pan shaped with a perforated bottom 44, a cylindrical side 45 and an annular top 46 with a large central port 47 through which a quantity of pulverized plastic material can be poured into the loader. The bottom of the loader is held an adjustable distance above book face 13 by means of a fairly hard but resilient landing ring or gasket 48 carried around the bottom rim of the loader. This landing ring is carried on a metal band 49 that can be screwed up or down on the cylindrical wall 45 of the loader to control the spacing between bottom 44 and face 13. The bottom of this landing ring fits over and outside the coiner ring 31 and holds the loader accurately centered over the book face. This centering of the loader is aided by the center button 33 engaging loosely in an opening in the bottom 44.

Inside of the hard resilient ring 48 is a readily yielding annular gasket 57 of sponge rubber about ¼ of an inch wide which acts as a dam in keeping the pulverized plastic material spaced slightly inwardly from the coiner ring. This gasket 57 has sufficient resiliency to assure a good contact with the surface of the matrix 13 regardless of adjustments of the ring 49 upwardly or downwardly. This gasket 57 assures a good barrier to the powder in spite of the vibrations of the loader. Thus, after the matrix is charged with material and the book closed, there remains a free space just inside the coiner rings through which any air within the plastic material can be expelled during the subsequent pressing of the record. The air escapes before the fused plastic closes the small gap between the coiner rings and "flashes" out between them.

Fastened to the center part of the loader bottom 44 is an annular gasket 50, also called the label-hold-down ring, which as seen in FIGURE 9 is adapted to press upon the back of an inverted record label 52 and hold it flat against face 13 during a loading operation. This prevents any particles of the plastic material from getting beneath the label. Gasket 50 includes a rubber annulus 54, which may be metal-backed for added rigidity, and which is supported from the bottom of the loader by four thin resilient legs or posts 56.

The powdered biscuit laid down by the loader is usually less than ¼ of an inch thick. Commercially a biscuit .20 of an inch thick, using the powdered materials described in detail below, is applied. This powdered biscuit has a diameter in the range from 11 inches to 11½ inches for nominal 12-inch records, which usually are about 11⅞ inches in diameter. It is preferred to use a diameter as nearly equal to the final record diameter as practicable while still providing the annular gas-escape space inside the coiner rings. A biscuit diameter of 11½ inches is commercially used.

Bottom 44 of the loader is relatively thick and is perforated with fairly large, closely spaced holes 57 through which the particles of the record base material are applied to the matrix. These holes 57 have a diameter lying in the range from ¼ to ½ an inch in diameter, and as shown are ⅜ inch in diameter, which is very suitable. During a loading operation, to insure that this pulverized material is evenly distributed beneath bottom 44 to a height determined by its lower surface, loader 16 is vibrated in any suitable way, for example by the pneumatically actuated piston 58 attached to the cylindrical wall of loader. The frequency of vibration used is approximately 60 cycles. Some of this vibration is transmitted to book 10 by ring gasket 48 and further acts to level the plastic material deposited on face 13 and to insure that it is packed with even density.

It has been found that the pulverized plastic material, which may exhibit certain wetness and sticking characteristics somewhat like wet snow, cannot be deposited in a satisfactorily even layer of the requisite homogeneous density using simply a spatula or doctor blade to spread it. By virtue of the action of the vibrating loader and/or the vibration of book 10, the pulverized material can be made to behave much as a dry fluid and will uniformly fill every part of the space between the loader bottom and the book face.

Because of the special supporting arrangement for label gasket 50 previously described, little or no vibration is transmitted to label 52. If there were strong vibration here, some of the particles of plastic might perhaps work beneath the label.

After a layer of the plastic material has been deposited in proper thickness upon die face 13, loader 16 is removed, the space formerly occupied by label gasket 50 is filled by hand, a top label is put in place to face-up on center spindle 33, and then the book is closed and inserted into hot press 19. Thereafter, the steps described in connection with FIGURES 1 through 5 are performed.

Because the record matrices are fabricated as "books" separate from other equipment, faster production and greater versatility are achieved. Since the thermal mass of each book is low, only a short time is required to heat or to cool it. Thus, a book can be removed from hot press 19 and quickly cooled to a temperature low enough to remove the finished record from it. Further, because these books are readily removable from the main press or presses, changeover from the production of one record to the production of another is simply a matter of using a different book.

Additionally, a number of books 10 each engraved with the same recording can be used simultaneously in the stepwise production of records illustrated in FIGURES 1 through 5, one book being loaded, a second being treated in hot press 19, a third being cooled in press 21, and a fourth one being emptied of a finished record and readied for charging with material for the next.

Loader 16 shown in FIGURES 7 and 9 has a thick bottom plate 44 perforated with relatively large diameter holes and its outer gasket ring 48 has an inside diameter slightly smaller than the diameter of a coiner ring on a book face. By making the bottom plate thick, more uniform vibration of the plate and better distribution of the pulverized record material is obtained.

Figure 8:
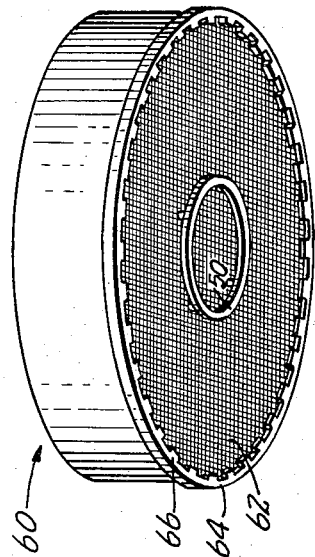
FIGURE 8 is a similar perspective view of a second loader slightly different from that in FIGURE 7.

FIGURE 8 shows a somewhat different loader 60 wherein the bottom plate 62 is formed of fine mesh screen. The outer gasket ring 64 of this loader has an inner face formed by a plurality of inwardly projecting lugs 66 of rubber about 1¼ inches long in circumferential length, so that this inner face is scalloped. Thus, when the loader rests on a record matrix book, the inmost faces of lugs 66 of gasket ring 64 will lie inside of the coiner ring defining a circle about 11 inches in diameter, while the stepped-back faces of the gasket will lie just outside of the coiner ring. Thus a series of air vents, instead of one that is continuous, are provided around the periphery of each layer of pulverized material deposited on the book face. Thus, when the record is pressed any trapped gases can escape through the spaces left by the lugs 66. Also any small amount of extrusion required to fill in these spaces has a substantial component of flow circumferentially along the ridges of the matrix instead of across them.

In a loader which has been successfully used and which is substantially like that illustrated in FIGURE 9, bottom plate 44 is aluminum 3/16 inch thick, the holes in it are 3/8 inch diameter and spaced as closely as possible, and the inside diameter of the outer gasket is approximately 11½ inches in diameter for a 12 inch record. High quality records are made by using this loader to deposit pulverized material having a fineness in the range from 3/16 screen down to a fineness of 50 or 60 mesh. For example, normally 20 mesh sized granular plastic material works extremely well. Various materials can be used, but a copolymer of vinyl chloride, with about 15% vinyl acetate, sold by Bakelite Co. under the designation "VYHH," and sold by B. F. Goodrich under the designation "428," is quite satisfactory. Although virgin copolymer as indicated above is preferable if the full advantages of the virgin plastic are to be maintained, these materials may also be formulated in the usual way according to trade practice and then pulverized. A typical formulation includes 1.5% lead stearate, 2% carbon black and 0.5% di-octyl phthalate, or equivalent. These are kneaded into the fused plastic material for about 10 or 20 minutes for complete dispersion. Then it is allowed to harden and pulverized. It is deposited in a layer 0.20 inch thick and treated in accordance with the steps indicated in connection with FIGURE 1 through 5.

Certain variations on this method have been found desirable under various conditions. For example as shown in FIGURE 9, a cylindrical barrier 70 may be included inside loader 45, this barrier having a diameter corresponding with that of the label hold-down ring 50. A less expensive mixture of powdered material is then placed in this barrier for use in cases where the center portion of the record can commercially be formed of cheaper material than the rest of the record.

In place of the label hold-down ring 50, a circular sponge rubber pad can be placed over the label to hold it down. Then the center region of the record can be filled in by hand. The requirements for this center portion of the record are far less critical than for the recording area carrying the sound grooves, as will be appreciated.

The above description is given in illustration and not in limitation of the invention. Various minor changes may occur to those skilled in the art and these can be made without departing from the spirit or scope of the invention as set forth.

I claim:

1. In the manufacture of plastic-base grooved phonograph discs, a method comprising the steps of taking a light-weight record matrix book having two hinged faces of thin metal, placing one of said faces horizontally in a free open position, placing a quantity of pulverized record base material in a pan-like loader having a perforated bottom, positioning said loader with its bottom parallel to and a measured distance above said horizontal book face, mechanically vibrating said book and loader to deposit on said face throughout substantially the entire recording area a uniform layer of said base material, heating and pressing said material in said book at a low pressure for a short time to initially soften said material and expel volatiles components and then increasing the pressure to a moderate value for less than about a minute to complete a phonograph disc, and thereafter removing said disc from said book.

2. In the manufacture of phonograph records, a method comprising the steps of taking a thin, light-weight record matrix having two hinged faces of thin metal, filling said matrix in the area of the record grooves with a disc-like layer of pulverized or powdered plastic material comprised of a major percentage of polyvinyl resin formulated with not more than 2% lubricant and plasticizer, applying by means of a press a relatively low pressure of less than about 100 p.s.i. to said matrix while heating it at a temperature of roughly 280° to 450° F. to soften said plastic material and expel volatiles and then applying a pressure somewhat greater than about 175 p.s.i. to squeeze said material into exact conformity with said matrix, and finally removing said matrix from the press, cooling it, and removing the finished record.

3. A method of manufacturing phonograph records of improved quality and at lower cost, said method comprising the steps of taking a record matrix, depositing within said matrix at least in the area of the record grooves an even layer of finely divided substantially pure thermoplastic record material, pressing said material within said matrix at a low pressure and at a temperature sufficient to initially soften said material and to expel volatile components, then increasing said pressure substantially while maintaining said temperature to fuse said material into a record with grooves closely conforming to said matrix the total pressing time being less than about a minute, and then releasing said pressure and cooling said record whereby the heat history of said material is minimized and the surface playing quality of said record is substantially improved.

4. An improved method of manufacturing phonograph records, said method comprising the steps of taking a light-weight heat conductive record matrix, applying within said matrix at least in the area of the record grooves a substantially uniform layer of powdered plastic record material having minimal amounts of lubricant and plasticizer, initially pressing said material within said matrix at a low temperature sufficient to soften said material and at a pressure below about 100 p.s.i. then quickly for a few seconds applying a higher pressure in the range of about 300 p.s.i. to fuse said material into a record, and then quickly releasing said pressure and cooling said record whereby the heat history of said record material is minimized and the surface playing and wearing quality of said record is excellent.

5. The method as in claim 4 wherein said initial pressing is for less than about a half-minute, and said higher pressure is applied for less than about 10 seconds.

6. An improved method of manufacturing phonograph records, said method comprising the steps of taking a thin light-weight metal matrix, applying within said matrix an even layer of powdered plastic record material having a minor amount of lubricant, placing said matrix in a hot press and initially pressing said material for less than about 30 seconds at a pressure less than 100 p.s.i. and at a temperature below about 450° F., then increasing the pressure on said material for about 5 to 10 seconds to fuse it together into a record closely confoming to said matrix, then quickly transferring said matrix to a cold press to cool said record, and thereafter removing said record from said matrix.

7. A simplified method of making high quality phonograph records at low cost, said method comprising the steps of depositing in a record matrix at least in the area of the record grooves a uniform layer of finely divided substantially pure thermoplastic record material, closing said matrix and placing it in a press, heating said matrix and pressing it at very low pressure and for a short time sufficient to initially soften said material and expel volatile components and then increasing the pressure to a moderate value for a total pressing time of less than about a minute, and then removing said matrix from said press, cooling said matrix and removing said record.

References Cited in the file of this patent

UNITED STATES PATENTS

| 1,500,698 | Wiehl | July 8, 1924 |
| 1,520,214 | Thomson | Dec. 23, 1924 |
| 2,016,860 | Hasche | Oct. 8, 1935 |
| 2,092,880 | Hunter et al. | Sept. 14, 1937 |
| 2,106,623 | Procter et al. | Jan. 25, 1938 |

(Other references on following page)

UNITED STATES PATENTS

| | | |
|---|---|---|
| 2,157,779 | Vance | May 9, 1939 |
| 2,240,971 | Wellman | May 6, 1941 |
| 2,241,441 | Bandur | May 13, 1941 |
| 2,434,477 | Winter | Jan. 13, 1948 |
| 2,501,823 | Leedom | Mar. 28, 1950 |
| 2,509,652 | Rushmer | May 30, 1950 |
| 2,587,427 | Alvarey | Feb. 26, 1952 |
| 2,605,506 | Miller | Aug. 5, 1952 |
| 2,734,748 | Parvin | Feb. 14, 1956 |
| 2,743,478 | Harlow et al. | May 1, 1956 |

FOREIGN PATENTS

| | | |
|---|---|---|
| 552,227 | Great Britain | Mar. 29, 1943 |